United States Patent Office 3,514,475
Patented May 26, 1970

3,514,475
OXIDATION OF THE ENAMINE OF
α,β-UNSATURATED KETONES
Sudarshan K. Malhotra, Northboro, Mass., assignor to
The Dow Chemical Company, Midland, Mich., a corporation of Delaware
No Drawing. Filed July 29, 1968, Ser. No. 748,208
Int. Cl. C07c *167/34*
U.S. Cl. 260—397.2                  9 Claims

ABSTRACT OF THE DISCLOSURE

A process for producing, α,δ-diketones which comprises reacting the enamine of an α,δ-ethylenically unsaturated ketone with molecular oxygen to produce an oxidized enamine intermediate which is thereafter hydrolyzed to the corresponding compound having keto groups at the α and δ positions.

BACKGROUND OF THE INVENTION

Enamines and enolate anions derived from α,β-unsaturated ketones undergo electrophylic attack at the α-carbon atom. The auto-oxidation of the enolate anions of these ketones also involves attack at the α-carbon atom leading predominantly to the α-ketone products having a hydroxy substituent at the β position. The enamines on the other hand, unlike the enolate compounds, undergo auto-oxidation giving mainly the γ-ketone (oxidized enamine) intermediates which upon hydrolysis in acid medium yield the corresponding unsaturated compounds having keto groups at the α and δ positions.

The oxidation reaction of the present invention differs from the art processes in its specificity and in its use of less severe reaction conditions. These differences enable the process of the present invention to be employed in the use of the complex molecules such as steroids where side reactions in other portions of the molecule very often occur using known oxidation procedures.

GENERAL DESCRIPTION OF THE INVENTION

The present invention is directed to a process for the preparation of α,δ-diketones from an enamine of an α,β-ethylenically unsaturated ketone possessing a methylene group at the δ-position, said process comprising oxidizing the enamine of the α,β-ethylenically unsaturated ketone with molecular oxygen to produce an oxidized enamine intermediate which is thereafter hydrolyzed to the corresponding compound having keto groups in the α and δ positions. In the present specification and claims, for convenience, the final product possessing keto groups in the α and δ positions will be referred to as an α,δ-dione.

In the present specification and claims, the term "enamine" refers to the reaction products of a secondary amine and an α,β-unsaturated ketone and generally can be said to be represented by the formula

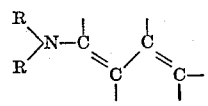

wherein R represents a lower alkyl moiety having from 1 to 4 carbon atoms, inclusive, and the R groups can be linked by means of a methylene moiety or a hetero atom such as O or N to produce a heterocyclic ring of 5 or 6 members.

The enamine of the present invention is prepared by reacting together a secondary amine such as pyrrolidine, morpholine, piperidine, or a dialkyl amine having from 2 to 4 carbon atoms per alkyl group, inclusive, and an α,β-unsaturated ketone having a methylene group in the γ-position. Representative α,β-unsaturated ketones are cholestenone, testosterone, 19-nortestosterone, progesterone, 10-methyl-Δ$^{1(9)}$-2-octalone, erogesterone, androst-Δ$^4$-en-3,17-dione, androst-Δ$^{1,4}$-diene-17-β-ol-3-one, pregna Δ$^{5,16}$-diene-5-β-hydroxy-20-one, Δ$^{1(9)}$-2-octalone and any other similar α,β-unsaturated ketones. However, unsaturated ketones bearing bulky substituents are not desirable as the molecule may be sterically hindered, preventing the formation of the enamine or the subsequent formation of the enamine or the subsequent formation of the corresponding α,δ-dione.

The oxidation of the enamine is effected by molecular oxygen. Any gas containing molecular oxygen may be utilized as the oxygen source and in a convenient procedure air is employed. The oxidation reaction takes place readily at temperatures of from 5° to 85° C. and most conveniently at room temperature. The reaction mixture is maintained at the reaction temperature for from about 1 to 48 hours. However, the reaction period can be cut by as much as 20 to 30 times by the addition of a catalytic amount of a metal salt catalyst to the reaction mixture. Representative metal salt catalysts include ferric chloride, ferric nitrate, ferric acetate, cupric chloride, cupric nitrate, cupric acetate, stannic chloride, mercuric chloride and lead chloride. The reaction scheme is assumed to be as follows:

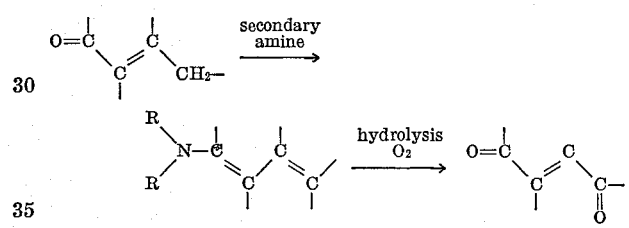

The oxidation of the enamine is carried out in an inert organic solvent as reaction medium. Representative inert organic solvents include diglyme, monoglyme, methanol, hexane, benzene or other inert organic liquids in which the enamine is soluble so as to produce a homogeneous reaction mixture. When the present invention is carried out utilizing a metal salt catalyst, it may be necessary to employ a co-solvent such as hexamethylphosphoramide, methanol, ethanol, t-butanol, dimethylformamide, dimethylacetamide, dimethylsulfoxide or the like to produce a homogeneous reaction mixture. The amount of co-solvent to be employed will vary depending upon the solvent utilized and upon the amount of catalyst employed.

The enamine is dissolved in the inert organic solvent in an amount sufficient to provide a reaction mixture containing from about 0.1 to about 10 percent by weight of the enamine with respect to the weight of the total reaction mixture. The use of a reaction mixture containing greater than 10 percent enamine is not desirable as such an increase in enamine concentration often results in undesirable side reactions. In those cases where a metal salt catalyst is employed, the metal salt or mixture of metal salts is added to the reaction mixture in an amount sufficient to provide from about .01 to 40 percent of a molar equivalent with respect to the amount of enamine employed.

In carrying out the process of the present invention, the enamine is dissolved in the organic reaction medium to produce a homogeneous reaction mixture. Following the production of the homogeneous reaction mixture, the oxidation of the enamine is effected by the addition of molecular oxygen to the reaction mixture. The molecular oxygen is generally added in an amount substantially in excess of the theoretical amount required to oxidize the amount of enamine present. In a convenient procedure, the addition of the molecular oxygen is effected by bubbling a gas such as air through the reaction mixture. During the addition of the molecular oxygen, the temperature of the reaction mixture is maintained within the reaction temperature range. As a result of the oxidation of the enamine, an oxidized enamine intermediate is produced in the reaction mixture. This oxidized enamine is hydrolyzed to the corresponding $\alpha,\delta$-dione by acidifying the reaction mixture. The reaction mixture is made acidic by the addition thereto of an acid such as dilute acetic, oxalic, sulfuric or hydrochloric acid. Following the acid hydrolysis of the oxidized enamine to the corresponding $\alpha$-$\delta$-dione, the product is isolated from the reaction mixture by known procedures. In a representative procedure, the acidic reaction mixture is extracted with an organic solvent in which the $\alpha,\delta$-dione is soluble such as ether, ethyl acetate, benzene, or methylene chloride and the resulting organic extract is neutralized with a weak base such as dilute aqueous sodium bicarbonate. The neutralized organic layer is then dried and concentrated in vacuo to remove the low boiling constituents and obtain the corresponding $\alpha,\delta$-dione product as a residue.

In an alternate procedure, the enamine starting material of the present invention is prepared by reacting together a secondary amine and an $\alpha,\delta$-unsaturated ketone having a $\gamma$-methylene group. The enamine thus produced is then oxidized in situ to produce the oxidized enamine intermediate which is hydrolyzed to the $\alpha,\delta$-dione product. In this alternate embodiment, the secondary amine and $\alpha,\beta$-unsaturated ketone are dispersed in an inert organic solvent as previously described and the resulting reaction mixture maintained at a temperature of from 5° to 85° C. for from about 1 to about 48 hours. The reaction consumes the secondary amine and $\alpha,\beta$-unsaturated ketone in equimolar proportions and the use of such proportions is preferred. While the use of substantially equimolar proportions is preferred, large excesses of $\alpha,\beta$-unsaturated ketones with respect to the secondary amine can be employed without adversely affecting the process; however, large excesses of the secondary amine are not recommended as they may cause undesired side reactions during the in situ oxidation of the enamine. The in situ oxidation of the enamine is effected by the addition of molecular oxygen to the reaction mixture as previously described and the desired product is separated from the reaction mixture by known procedures.

SPECIFIC EMBODIMENTS

The following examples are merely illustrative and are not deemed to be limiting.

Example 1.—Oxidation of the pyrrolidine enamine of $\Delta^4$-androsten-3,17-dione The pyrrolidine enamine was prepared by dissolving pyrrolidine (1 ml.) and $\Delta^4$-androsten-3,17-dione (0.7 gram) in 20 milliliters of methanol and heating the resulting reaction mixture on the steam bath for a few minutes. During the heating procedure, the crystalline pyrrolidine enamine of $\Delta^4$-androsten-3,17-dione precipitated from the reaction mixture, was isolated by filtration and dried. The dried pyrrolidine enamine of $\Delta^4$-androsten-3,17-dione 750 mg.) was found to melt at 207° to 208° C. A portion of this pyrrolidine enamine was dissolved in 200 milliliters of benzene (350 mg.) and a solution of ferric chloride (50 mg.) in 10 milliliters of hexamethylphosphoramide added thereto. The reaction mixture thus produced was maintained at room temperature and air bubbled through the reaction mixture at a rate of 100 milliliters per minute for 1 hour. Following the addition of the air to the reaction mixture, 25 milliliters of 1 N HCl was added to the reaction mixture and the mixture stirred for 15 minutes whereupon the acidified reaction mixture was extracted with ether and the ether extract washed with sodium carbonate, dried and stripped in vacuo to give the $\Delta^4$-androsten-3,6,17-trione product as a solid residue. This solid product was recrystallized from methanol and the recrystallized product found to melt at from 215° to 225° C.

Example 2.—Oxidation of the pyrrolidine enamine of progesterone

The pyrrolidine enamine of progesterone (370 mg.) and ferric chloride (50 mg. in 10 milliliters of hexamethylphosphoramide) were dissolved in 200 milliliters of benzene. Air was bubbled through the reaction mixture thus prepared, the reaction mixture acidified and the product isolated all as described in Example 1. The 6-keto-progesterone product was recrystallized from an acetone-hexane mixture and found to melt at 188° to 190° C.

Example 3.—Oxidation of the pyrrolidine enamine of 19-nor-testosterone

Pyrrolidine enamine of 19-nor-testosterone (500 mg.) and ferric chloride (50 mg.) were dissolved in a mixture of 200 milliliters of benzene and 5 milliliters of methanol. Air was passed through the resultant reaction mixture for 15 minutes at room temperature. Following the addition of air, the reaction was acidified by the addition of 10 percent HCl. The acidified reaction mixture was then neutralized with sodium carbonate, extracted with ether and the ether extract was washed with water and dried over anhydrous magnesium sulfate. The dried ether extract was then stripped in vacuo to give a semi-crystalline product. This semi-crystalline product showed infrared absorption bands at 1720 cm.$^{-1}$ to 1670 cm.$^{-1}$ and a maximum absorption of ultra-violet at 250 millimicrons. The infrared and ultraviolet spectrum analysis confirmed the identity of the product as being 17-$\beta$-hydroxy-$\Delta^{5(10)}$-estren-3-one.

Example 4

In similar procedures, the following, $\alpha,\delta$-diones are prepared:

4-cholestene-3,6-dione (M.P. 123°–124° C.) by oxidizing with air the pyrrolidine enamine of 4-cholestene-3-one (M.P. 184°–186° C.) at 25° C. for 1 hour in a benzene-hexamethylphosphoramide reaction medium with ferric chloride as catalyst.

4-cholestene-3,6-dione (M.P. 123°–124° C.) by oxidizing the pyrrolidine enamine of 4-chloestene-3-one (M.P. 184°–186° C.) with air at room temperature for 1 hour in a benzene-hexamethylphosphoramide reaction medium with cupric chloride as the catalyst.

10-methyl-$\Delta^{1(9)}$-octalin-2,6-dione (M.P. 70°–72° C.) by oxidizing with air the morpholine enamine of 10-methyl-$\Delta^{1(9)}$-octalone-2 at the reflux temperature for 1 hour in benzenedimethylsulfoxide reaction medium with cupric chloride as a catalyst.

8-methyl-5,6,7,8-tetrahydro-indane-3,5-dione (mol. wt. 188.1) by oxidizing with air the pyrrolidine enamine of 8-methyl-5,6,7,8-tetrahydro-indanone-5 at room temperature for 1 hour in a benzene-hexamethylphosphoramide reaction medium as reaction medium with ferric chloride as catalyst.

4-cholestene-3,6-dione (M.P. 123°–124° C.) by oxidizing with air the diethyl amine enamine of 4-cholestene-3-one at room temperature for 1 hour in benzene-dimethyl sulfoxide reaction medium with ferric chloride as catalyst.

4-cholestene-3,6-dione (M.P. 123°–124° C.) by oxidizing with air the pyrrolidone enamine of 4-cholestene-3-one at 15° C. for 2 hours in monoglyme-benzene mixture as reaction medium with ferric chloride as catalyst.

Example 5

10-methyl-$\Delta^{1(9)}$-octalin-2,8-dione (M.P. 70°–72° C.) was prepared by oxidizing the pyrrolidine enamine of 10-methyl-$\Delta^{1(9)}$-octalone-2 (B.P. 149°–150° C./1 mm. of Hg). The oxidation was carried out at room temperature for 16 hours. Following the oxidation procedure, the enamine intermediate was hydrolyzed with 50 percent acetic acid and the final product separated as previously described.

In an alternate procedure, the pyrrolidine enamine of 10-methyl-$\Delta^{1(9)}$-octalone-2 was oxidized in the presence of a catalytic amount of ferric chloride. The oxidation procedure was carried out at room temperature for 1 hour. Following the oxidation period, the enamine intermediate was hydrolyzed with 50 percent acetic acid and the desired product separated as previously described. Yield 75 percent.

The enamine starting materials employed in the present invention are prepared in accordance with known methods. A representative method includes reacting together the secondary amine such as pyrrolidine, morpholine, dimethyl amine, diethyl amine, piperidine and dibutyl amine and the $\alpha,\beta$-unsaturated ketone in the presence of an inert organic solvent as a reaction medium. The reaction is readily carried out at a temperature of 25° to 100° C. and most conveniently at the reflux temperature of the reaction mixture. The enamine generally precipitates from the reaction mixture and can be separated therefrom by filtration. In those cases where the enamine does not precipitate from the reaction mixture it can be isolated therefrom by removing the reaction medium and other low boiling constituents to leave the desired enamine product as a residue.

I claim:

1. The method for preparing an $\alpha,\delta$-dione containing the moiety corresponding to the formula

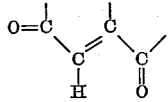

comprising oxidizing with molecular oxygen the enamine of an $\alpha,\beta$-ethylenically unsaturated ketone having a methylene group in the $\delta$-position to produce an oxidized enamine intermediate which is thereafter hydrolyzed with acid to said $\alpha,\delta$-dione; said enamine starting material containing the moiety corresponding to the formula

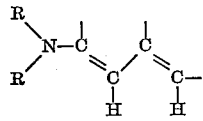

wherein R represents a lower alkyl moiety having from 2 to 4 carbon atoms, inclusive, and the R groups can be linked by means of a methylene moiety or a hetero atom such as oxygen or nitrogen to produce a heterocyclic ring of 5 or 6 members.

2. The method of claim 1 wherein the oxidation reaction is carried out in the presence of a catalytic amount of a metal salt catalyst.

3. The method of claim 1 wherein the enamine is pyrrolidine enamine and the metal salt catalyst is ferric chloride.

4. The method of claim 2 wherein the metal salt catalyst is present in an amount of from 0.1 to 40 percent of a molar equivalent with respect to the amount of enamine employed.

5. The method for preparing an $\alpha,\delta$-dione containing the moiety corresponding to the formula

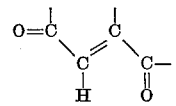

comprising reacting together, in an inert organic solvent as reaction medium, (a) a secondary amine selected from the group consisting of diloweralkyl amines and heterocyclic amines having 5 or 6 members, and (b) an $\alpha,\beta$-ethylenically unsaturated ketone having a methylene group in the $\gamma$-position; said reaction producing an enamine containing the moiety corresponding to the formula

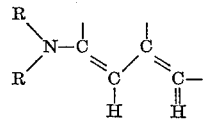

oxidizing said enamine with molecular oxygen and thereafter acidifying the reaction mixture to produce the $\alpha,\delta$-dione product.

6. The method of claim 5 wherein the metal salt catalyst is present in an amount of from 0.1 to 40 percent of a molar equivalent with respect to the amount of enamine employed.

7. The method of claim 5 wherein the reaction is carried out at a temperature of from 5 to 85° C.

8. The method of claim 5 wherein the oxidation is carried out in the presence of a metal salt catalyst.

9. The method of claim 5 wherein the secondary amine is pyrrolidine, morpholine, piperidine, dimethyl amine or diethyl amine and the $\alpha,\beta$-ethylenically unsaturated ketone is an $\alpha,\beta$-ethylenically unsaturated mono-keto-steroid.

No references cited.

ELBERT L. ROBERT, Primary Examiner

U.S. Cl. X.R.

260—397.3, 397.4, 586